Nov. 1, 1938.  G. J. CADDY  2,134,907
APPARATUS FOR FILLING CARTONS
Filed Aug. 5, 1935  3 Sheets-Sheet 1
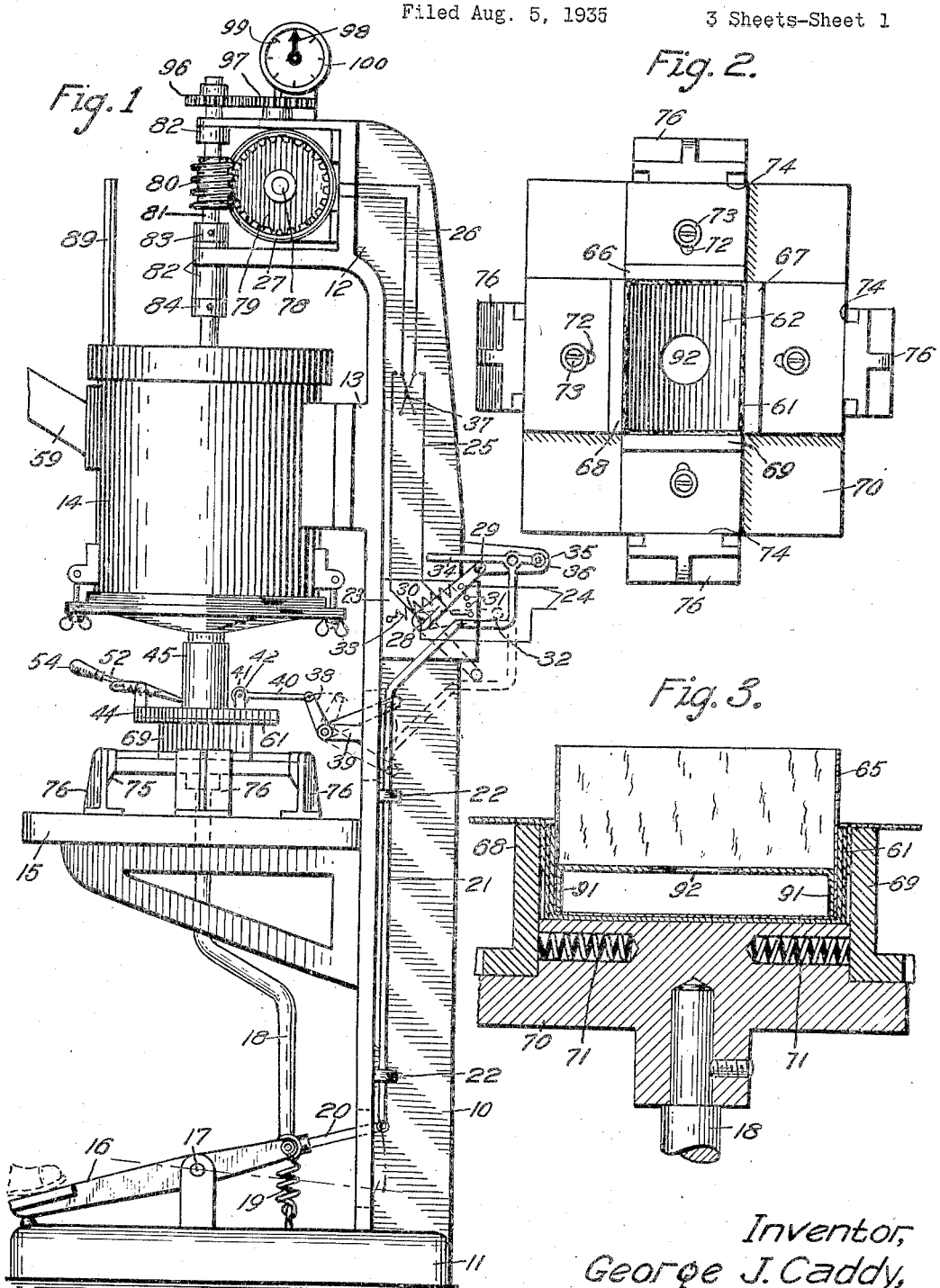
Inventor,
George J. Caddy,
by Frank G. Hattie
Attorney.

Nov. 1, 1938. G. J. CADDY 2,134,907
APPARATUS FOR FILLING CARTONS
Filed Aug. 5, 1935 3 Sheets-Sheet 2
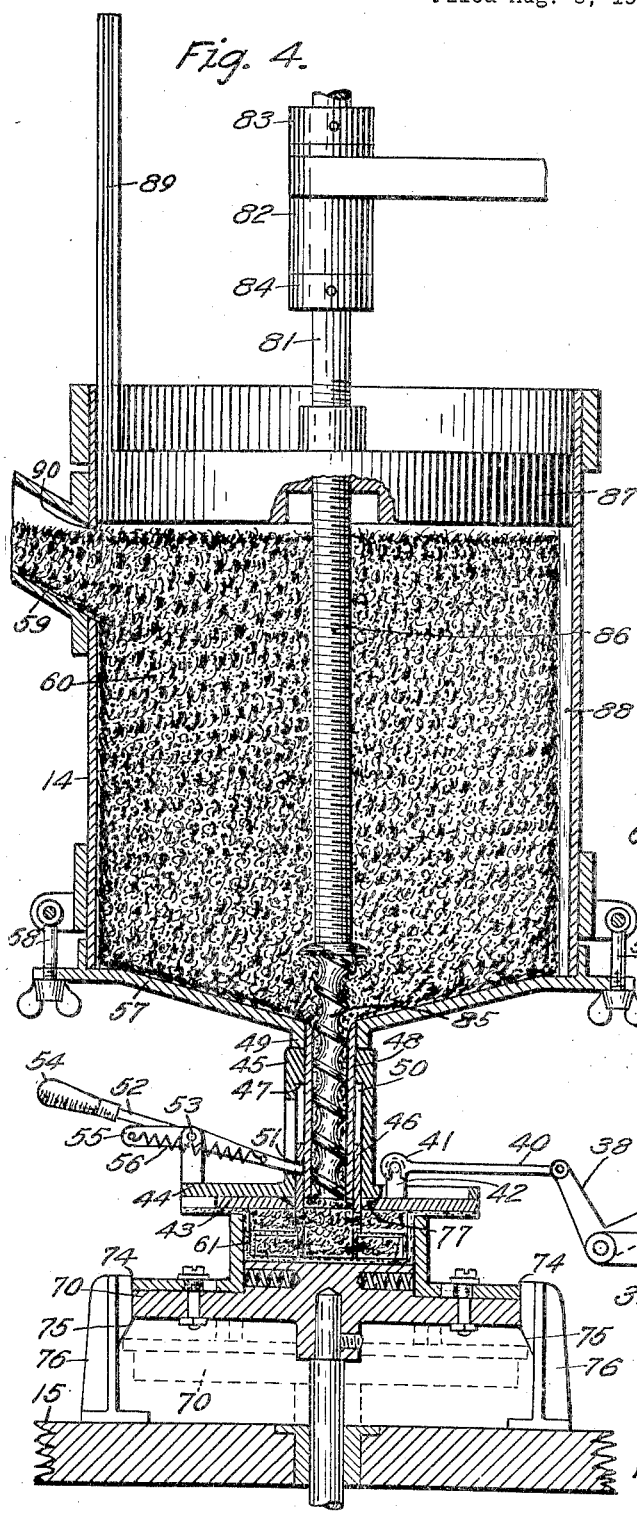
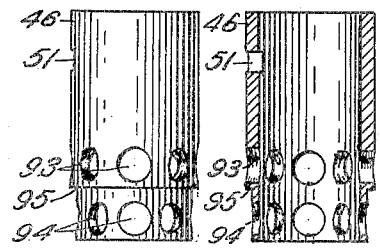
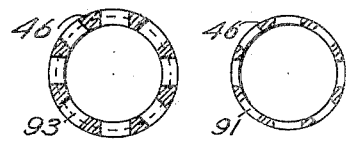
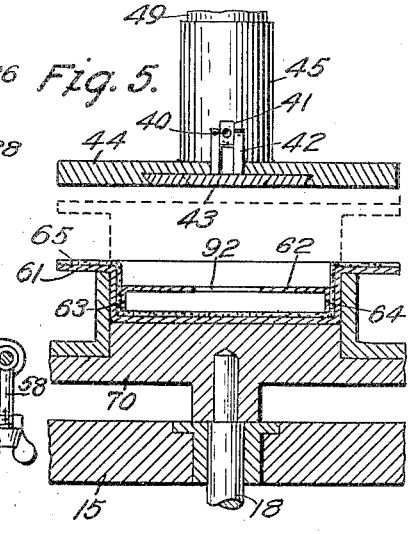
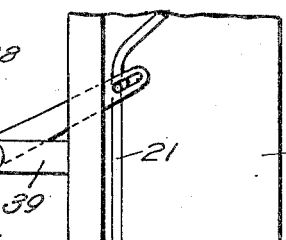
Inventor,
George J. Caddy,
by Frank G. Hattie
Attorney.

Nov. 1, 1938.     G. J. CADDY     2,134,907
APPARATUS FOR FILLING CARTONS
Filed Aug. 5, 1935     3 Sheets-Sheet 3
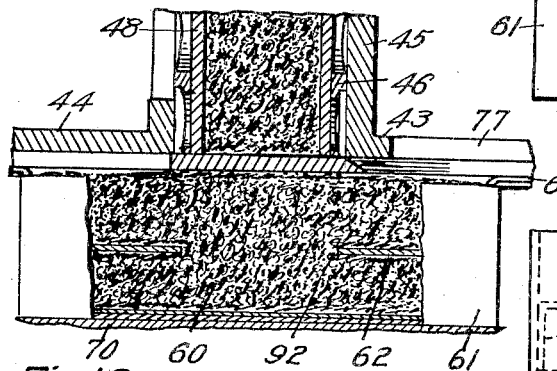
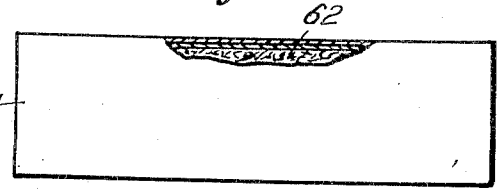
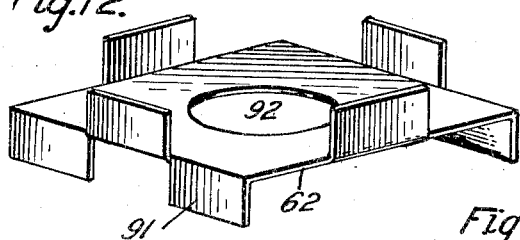
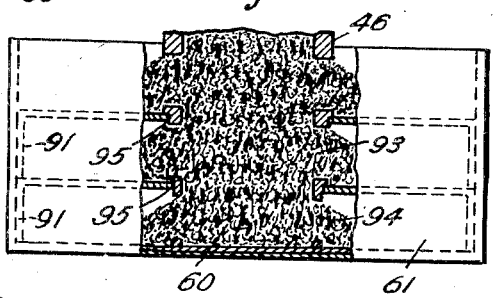
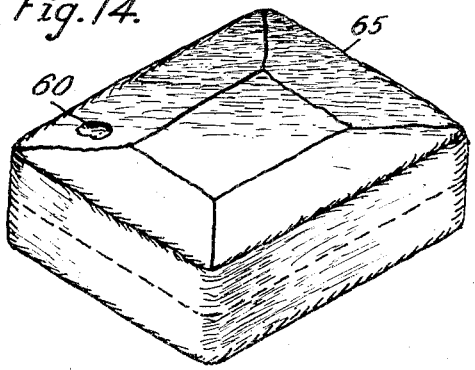
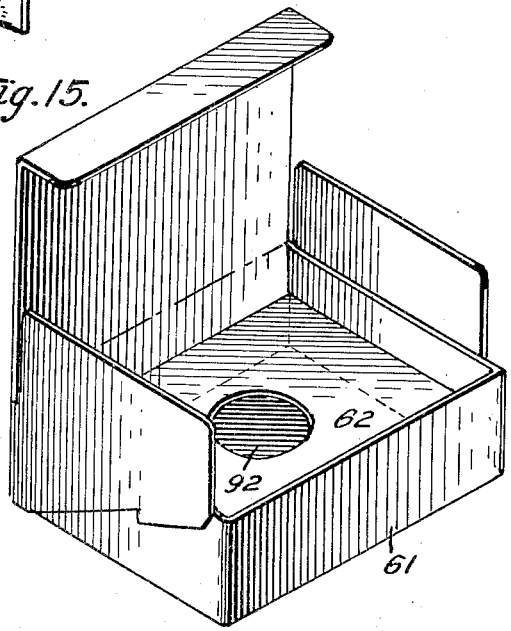
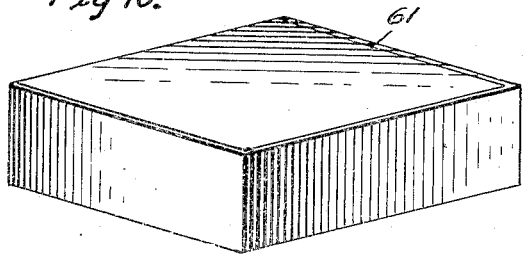
Inventor,
George J. Caddy,
by Frank G Hattie
Attorney.

Patented Nov. 1, 1938

2,134,907

UNITED STATES PATENT OFFICE 2,134,907

APPARATUS FOR FILLING CARTONS

George J. Caddy, Saugus, Mass.

Application August 5, 1935, Serial No. 34,700

6 Claims. (Cl. 226—125)

The invention relates to a method and apparatus for filling unit cartons or individual compartments with minced material of which the following is a specification:

The invention consists of a method of filling unit divisional cartons or receptacles with minced material at a predetermined weight such as pounds, half-pounds or more to facilitate the handling of large quantities of products for market and is especially adapted for freezing processes where food is prepared for future or long transportation service. The cartons can be of any size to conform to the weight of the product but in divisional sizes embodied in an individual carton, partitions are used having suitable supports for maintaining an equal divisional area in the carton to be filled with the product. To permit the material to enter the divisional area, a hole is formed in the partition adapted to receive a cylindrical nozzle having feeding holes for each division in the carton with a sealing shoulder resting on the partition to prevent the product from being forced by the said partition.

The invention further consists of a method of transporting the material from the hopper to the carton by a series of feeds rather than by direct pressure which would destroy the natural characteristics of the material.

The method of transposing the material is carried out by the use of a feeding screw secured to a shaft extending upwardly through the hopper and rotated preferably by an electrical motor for feeding the material at the nearest position to the carton by leading it in such a manner as to split the total pressure necessary to prevent an accumulation of pressure and lower the pressure at any point to a value which does not exceed a pressure which would destroy the natural voids due to grinding of the material in order that the food essentials and characteristics of the material will be maintained in their proper and natural form so that the anticipated food value of the material may be realized.

To replace the material carried off by the under feeding screw a follow-up pressure is used consisting of a piston threaded on the screw-feeding shaft which is free to move axially but restrained from rotation by a key secured to the hopper co-operating with a slot in the piston.

The follow-up movement of the piston is proportional to the under feeding screw movement volumetrically, thereby eliminating a possibility of accumulated pressure of vacuum.

The invention further consists of a measuring system for determining the amount of material fed to the carton which provides a definite ratio of rotation of a shaft in relation to the volume of the carton. The amount is registered on a suitable indicator and controlled by the operation of the machine.

The invention further consists of various operating devices to make the operation of the machine automatic as far as possible, such as placing the carton in position and releasing it in time relation to the machine, a manually operated device to allow the nozzle to be placed in position and removed so that a cutting device will sever the material in the carton from the main supply.

The invention further consists of a rheostat operated by the starting lever having sufficient lost motion to allow the carton to be placed in position before the motor starts operating the machine.

The object of the invention is to provide a novel, automatic method of filling unit or division cartons with minced material at a predetermined weight to facilitate the handling of large quantities of food products, such as "Hamburg steak," or the like for market or transportation service with quickness and dispatch to eliminate excessive labor cost and to maintain absolute sanitary conditions.

Referring to the figures:

Fig. 1 is a side elevation of the machine.

Fig. 2 is a plan view of the carton in position on the packing table preparatory to filling.

Fig. 3 is a cross-section through the packing table and carton.

Fig. 4 is a vertical cross-section through the hopper and feeding device.

Fig. 5 is cross-section through the carton supporting table and the abutting plate showing how the cartons are placed in position.

Fig. 6 is an elevation of the feeding nozzle.

Fig. 7 is a vertical section of the same.

Fig. 8 is a horizontal cross-section through the upper feeding holes of the nozzle.

Fig. 9 is a horizontal cross-section through the lower feeding holes of the nozzle.

Fig. 10 is a cross-section through the abutting table nozzle and nozzle housing and a filled carton partly broken away showing the divisional structure with the nozzle above the cutting gate after the material in the carton has been severed from the main supply.

Fig. 11 is an elevation of the carton broken away from the top showing how the material is packed.

Fig. 12 is a perspective view of one of the divisional members of alternate formation.

Fig. 13 is an elevation of the three divisional compartments partly broken away.

Fig. 14 is a perspective view of a package of material ready for use with a divisional line for separating.

Fig. 15 is a perspective view of an open carton with the divisional partition in position.

Fig. 16 is a perspective view of a filled carton ready for shipment.

The drawings illustrate the novel method and apparatus for feeding, packing and weighing minced material, such as "Hamburg steak", etc. into containers. The method is carried out by suitable apparatus supported on a frame 10 and base 11. The frame is provided with a head 12 integral with the upper end for supporting the motor for operating the movable members. Formed integral with the frame 10 is a pad 13 to which a material hopper 14 is secured; also supported by the frame 10 is a table 15 for supporting the co-operating elements of the machine for packing the material into the containers.

Formed integral with the base 11 is an upwardly extending lug for supporting the foot lever 16 which is fulcrumed at 17. The foot lever 16 is pushed downwardly by foot power, which causes the rod 18 to move upwardly to locate the container in position for the material feeding operation. When the foot is removed from the lever 16 the spring 19 exerts a downward pull and returns it to the non-operative position. The movement of the foot lever 16 also starts and stops the motor for operating the machine.

Secured to the lever 16 is an extension 20, the outer extremity of which is connected to a vertical reciprocating rod 21. The rod 21 slides in the bearings 22 formed integral with the frame 10. The vertical reciprocating movement of the rod 21 operates a rheostat 23 which contacts a suitable electrical source (not shown) having conductors 24 which lead into the rheostat 23 and circuits 25 and 26 for energizing the motor 27 for operating the machine. The rheostat 23 is provided with a swinging switch lever 28 having a rod-engaging projection 29. The rheostat lever 23 is fulcrumed at 30 and when the lever in its path of rotation wipes over suitable contacts 31 controls the starting resistance of the motor for operating the machine.

The machine is in the non-operative position as shown in dotted lines and is in the operative position indicated by the full lines. The upper extremity of the rod 21 is of definite configurations to operate the rheostat 23 in either direction. When the rheostat lever 28 is in the lower non-operative position, as shown in dotted lines, it contacts the surface 32 of the rod 21 and any upward movement of the said rod 21 will cause the lever 28 to swing upwardly to the position shown in full lines, this is the limit of the movement of the rod 21 and the surface 32 and in relation to the rheostat it is lost motion to allow a time element to bring the container to be filled into position before the motor starts operating the machine. The upward movement of the rod 21 forces the rheostat lever 28 above the mid-position as shown in Fig. 1 against the pull of the spring 33 to beyond the point of balance when the spring 33 carries the switch lever over the rheostat, contacts and energizes the electrical circuits 25 and 26, and motor 27 for starting the machine for feeding the food material into the containers. After the container is filled the operator removes his foot from the lever 16 of the second order and the spring 19 returns the starting mechanism to the non-operative position. When the rod 21 moves in the downward direction it carries with it the rheostat reversing lever 34 which swings at 35 on the bracket 36 formed on the frame 10. Any movement in either direction of the rod 21 causes the lever 34 to swing and on its downward movement it exerts a downward force against the rheostat switch lever projection 29 against the tension of the spring 33 until it reaches a position beyond the point of balance when the spring 35 exerts an unrestrained pull on the rheostat lever in the downward direction and shuts off the motor and stops the machine. Each container is placed in the machine to be filled and the operator moves the front of the foot lever 16 downwardly which causes the rod 21 to rise carrying with it the switch lever 28 and projection 29 which co-ordinates in the working operation function of the switch for operating the machine.

Under certain conditions it is necessary to reverse the direction of the rotation of the motor 27, especially when the hopper 14 is emptied of the minced material and the filling members must be returned to the starting position so the hopper 14 can be refilled for the next operation. This is accomplished by reversing the switch 37 in the motor circuits 25 and 26 to reverse the current to the motor.

When the container is filled with material it becomes necessary to cut off the main supply from the said container by a novel device operated by the foot lever 16 and rod 21. To accomplish this a bell crank 38 is provided which fulcrums on the lug 39 rigidly secured to the frame 10. One end of the bell crank is pivotally secured to the rod 21 and the opposite end is secured to a connecting rod 40 forming part of the cutting-off mechanism operated after the carton is filled. The opposite end of the connecting rod 40 is provided with a latch 41 which fits over a catch pin formed in the lug 42. This construction allows the operating mechanism to be connected or disconnected from the machine at the will of the operator to suit the required condition.

The lug 42 is rigidly secured to the sliding gate 43 which is provided with a hole having a knife edge construction which serves as a cutting-off device for the material when the container is filled. The gate is best shown in Figs. 4 and 5 and is suitably mounted in the abutment plate 44 having a sleeve 45 in which the reciprocating feeding nozzle 46 slides vertically through the cutting hole into the container for the feeding operation or vice versa. The nozzle 46 slides in the sleeve 45, the upward movement being limited by the shoulder 47 and the downward movement of the bottom of the container when it is located in position. Concentric with sleeve 45 and nozzle 46 is an inner sleeve 48 which is rigidly secured to the upper part of the sleeve 45 and a sleeve 49 integral with the hopper 14. This structure supports the abutment plate 44, sleeve 45 and inner sleeve 48, the latter extending downwardly to the gate 43 to allow the cut-off operation to take place and at the same time to hold the material in the hopper when the container is removed. When the structure is assembled there is an annular groove 50 formed between the sleeves 45 and 48 in which a manually operated nozzle travels to facilitate the operation of the machine. To operate the feeding nozzle 46 a hole 51 is formed in the said nozzle. The hole 51 engages the opposite end of the lever 52 fulcrumed in the lug 53 and swings in either direction in the slot formed in the outer sleeve 45. On the opposite end of the lever 52 is a handle 54 for operating the lever. Formed integral with the lug 53 is a horizontal extension 55 to which is anchored a spring 56, the opposite end of which is anchored to the lever 52. By a quick thrust on the handle 54, the lever 52 is carried by the center of balance against the tension of the spring 56 which causes the feeding nozzle to move to the upper position and holds it in position. A reverse movement serves in the opposite position. The structure in which the feeding nozzle operates is rigidly secured to the base 57 of the hopper 14. The base 57 is held rigidly to the hopper by the clamping device 58. Secured to the hopper 14 is an inlet 59 for feeding the ground minced material 60 into the hopper 14 to be fed into the carton during the operation of the machine. The minced ground material is fed through the inner sleeve 48 after the container 61 has been forced against the abutment plate 44 by a novel device forming part of the invention.

The containers can be of any well-known type as shown in Fig. 15 adapted to be filled at a predetermined unit weight in accordance to the area of the box or divisional predetermined weights in each container, such as pounds or half-pounds or more if needed. The nozzle embodied in the invention can be made to make as many practical divisions as necessary. The drawings mostly show two divisions for the material, while Fig. 13 shows three divisions, all of which can be filled at a predetermined weight and simultaneously in accordance with the area of the container or division. The partitions 62 are bent over as indicated by the numerals 63 and 64. The bent over portion rests against the bottom of the container and if there are more partitions the bent over portion rests against the lower partition, and so on. Fig. 12 shows an alternate construction of the partition, in fact they can be made in any configuration that will carry out the operation of the structure.

At the beginning of the operation the container 61 is placed in position as shown in Fig. 5, then a sheet of Cellophane paper 65 is placed in position as shown in Fig. 3. The partition 62 is then placed in position and a protecting sheet such as Cellophane is turned against the lids of the container. The container is placed in a chamber formed of four movable walls, 66, 67, 68, and 69 having right angle bases which are free to slide on the table 70 which has a reciprocating movement imparted to them for holding or releasing the container as the condition requires.

When the table 70 is in the inoperative position, shown in dotted lines, Fig. 4, the walls 66 to 69 inclusive are all forced outwardly by the springs 71 and the carton can then be placed in position or removed as the condition requires. The horizontal bases of the partitions are provided with slots 72 in which a guiding screw 73 is free to allow the partition to move in or out for holding or releasing the container in accordance with the operation of the machine and the length of the slots. After the container is in position, the operator pushes the foot lever downwardly, thereby raising the table 70 by means of the rod 13. This movement forces the container and chamber against the abutment plate 44 and when the motor starts the feeding operation commences.

The upward movement of the table 70 causes the edge of the base 74 to wipe against the cam surfaces 75 integral with the upright 76 secured to the table 15. This movement causes the walls to move outwardly to just the size of the container so the packing pressure will not expand the carton. When the container is filled the feeding nozzle 46 is raised out of the container 61 by the lever 43 and then through the knife edge cutting hole 77 formed in the gate 43 and the material is ready to be cut off and the carton removed from the machine.

The table 70 is now lowered as indicated by the dotted lines, Fig. 4. By this movement the housing partitions are all moved away from the container which prevents the box from sticking and by the same movement the bell crank 38 swings back, thereby pulling the gate 43 across the top of the container thereby cutting off the material in the carton from the supply by the knife edge formed in the hole 77.

The motor 27 is provided with a shaft 78 having a worm gear 79 mounted thereon. The gear 79 meshes with a worm 80 mounted on the shaft 81. The shaft 81 is provided with bearings 82. As the motor and shafts are designed to rotate in both directions, thrust collars 83 and 84 are provided to take the thrusts of the rotating strain in both directions.

The shaft 81 on its lower extremity is provided with a feed screw 85 for feeding the minced material into the container 61. The screw extends to the lower edge of the inner sleeve 48 and prevents the material from sticking to the nozzle 46 when it is removed after the packing operation. The feed screw 85 is formed integral with the shaft 81 and located at the bottom of the hopper with the mass of material in its path to be transported into the carton 61.

The shaft 81 is provided with screw threads 86 which cooperate with the thread cut in the piston 87 for moving the disc up or down as the condition requires during the operation of the machine.

Cut in the piston 87 is a slot which slides on the key 88 in its reciprocating movement in the hopper 14. The piston can move up or down but is restrained from rotating by the key 88. A gate 89 is provided to prevent the material from the conduit 59 from dropping through the opening 90 on the top side of the piston 87 after the disc has moved below the entrance of the conduit in the hopper 14. The gate 89 is formed integral with the disc 87 and moves with it during the operation of the machine.

One of the embodiments of the invention is to co-ordinate the resulting forces of the various functions of the machine to transpose the material in the mass to the carton 61 in such a manner as to prevent accumulated pressure, or vacuum, to retain the natural voids in the material due to grinding so the food essentials and characteristics of the material will be maintained in their proper and natural form in order that the anticipated food values of the material may be realized. This is accomplished by the feed screw 85 being located at the nearest position to the container 61 so that a maximum amount of material will be extended at a minimum pressure. Co-operating with the feed screw is a follow-up feeding device 87 operated by the screw threads 86 cut on the shaft 81 for replacing the material carried off by the under feed screw in proportion to the screw feeding movement, volumetrically eliminating the possibility of accumulated pressure vacuum.

The nozzle 46 is manually moved in and out of the carton 61 by the lever 52 to allow the carton 61 to be placed in a definite position to permit the minced material to be packed into the carton or any of the divisional chambers at a predetermined weight in relation to the area of the carton 61.

One of the embodiments of the invention is to pack the material in the carton or any number of practical divisions or areas by the novel construction of the nozzle 46. The nozzle 46 is preferably made in cylindrical form with a hole 51 therein to allow it to be moved vertically by the lever 52. To fill a unit container any number of holes formed in the lower surface of the said nozzle, will permit the material to enter the carton. To fill divisional compartments with material, a partition 62 having supports 91 of definite measurements to determine the area to be filled. Formed in the center of the partition 62 is a hole 92 which is adapted to receive the nozzle 46 which allows it to rest on the bottom of the carton. In this position the material 60 is directed through two sets of holes 93 and 94, Figs. 6, 7, 8, and 9 by the working pressure of the feed screw 85. To prevent the working pressure from forcing the material by the nozzle 46, a shoulder 95 resting against the partition 62 around the edge of the hole 92 in the partition 62, this prevents the material from being forced by the partition and ensures that the material will be forced in the right direction.

The material enters the nozzle 46 and is fed downwardly against the bottom of the carton with practically no resistance with all the ingredients held by the basic elements of the material, such as fat, blood, fibre, etc. The value of the food material is retained at this point in the operation and by the pressure of the material on the bottom of the container the foods material is forced in its entirety into the container with all the food values and characteristics intact. When the carton is filled with material 60 it is necessary to retain the material in the tube for filling the carton. This is accomplished by the construction of the feeding screw and its location in relation to the container 62 and the nozzle 46. In Fig. 4 the drawing shows the feed screw 85 directly above the cutting gate 43 with a mass of material 60 between the inner sleeve 48 and the feeding screw 85. Any material that would adhere to the nozzle when it was removed from the container 61 would be held back by the gate 43, inner sleeve 48 and feeding screw 85, thereby retaining all the material that had been forced into the container covering the predetermined amount registered on the indicating device of the machine.

The cartons 61 are of such size as to hold a definite weight of material which must be measured in pounds, half-pounds, etc. This is accomplished by a driving gear 96 driven by the feed shaft 78. The gear 96 meshes with a driving gear 97 mounted on a shaft having a worm wheel for rotating the indicator arm 98 which registers with the calibration 99 marked on the indicator 100. This amount of material is fed to the carton and provides a definite ratio of rotation of the feed screw and shaft in relation to the volume of the carton.

In operation, the material is ground and fed into the hopper 14 through the conduit 59 until the hopper is filled. The operation of filling the carton is continuous until the hopper 14 is emptied and it is then filled up again and the carton operation is repeated.

The carton holder in the non-operative position is considerable distance below the abutting plate 44. The operator then presses down the foot lever 16 and forces the carton and its supporting member upwardly against the abutting plate 44. Simultaneously with the movement of the cutting plate 43 which is moved to the left until the cutting hole 77 registers with the nozzle to allow it to be manually forced into the carton. The rheostat is then automatically thrown into the operative position by the spring 33 which starts the motor and the feeding and filling operation takes place. The operations are continuous until the hopper 14 is emptied, after which the reversing switch 37 is thrown in and the rotation of the motor is reversed which causes the screw on the feeding shaft to return the piston 87 to the upper position to allow the hopper 14 to be refilled through the conduit 59.

What I claim as new and desire to secure by Letters Patent in the United States is:

1. In an apparatus for filling unit or divisional cartons with minced material from a suitable supply having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, threads on the shaft co-operating with the threads cut in the encompassing piston which is free to move axially and restrained from rotating by said key to allow the material in the mass to be transposed to the extrusion feeding screw and prevent accumulated pressure and retain the natural voids as the result of grinding, and means for supporting the carton and lifting it into position to be filled, a second means for raising and lowering the nozzle into the carton, a third means for cutting off the material in the carton from the supply, a fourth means for placing the carton in position before the motor is started and releasing it after the carton is filled, a fifth means for reversing the motor to return the piston to the starting position, a sixth means for determining the amount of material in the carton.

2. In apparatus for filling unit or divisional cartons with minced material from a suitable supply having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, threads on the shaft co-operating with threads cut in the encompassing piston which is free to move axially and restrained from rotating by said key to allow the material in the mass to be transposed to the extrusion screw and carton and prevent accumulated pressure and retain the natural voids as the result of grinding, a table secured to the frame for supporting the operating members, an operating foot lever manually operated in one direction and by a spring in the opposite direction, a vertical reciprocating table operated by the foot lever and rod, walls having their respective bases resting on the reciprocating table having cam surfaces for forcing the walls against the carton while being filled, springs inserted in the reciprocating table for releasing the walls after the carton is filled.

3. In an apparatus for filling unit or divisional cartons with minced material from a suitable supply having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, threads on the shaft co-operating with threads cut in the encompassing piston which is free to move axially and restrained from rotating by said key to allow the material in the mass to be transposed to the extrusion feeding screw and prevent accumulated pressure and retain the natural voids as the result of grinding, an abutting plate, a sleeve integral with the abutting plate having a slot therein in which the nozzle is located, a lever of the second order fulcrumed on the abutting plate engaging the nozzle, the movement of the lever actuating the nozzle to enter or to be removed from the carton, a spring for locking the lever and the nozzle in either position.

4. In an apparatus for filling unit or divisional cartons with minced material from a suitable supply, having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, an axially-moving feeding tube encompassing the nozzle operated by a lever, threads on the shaft for co-operating with threads cut in the encompassing piston which is free to move axially and restrained from rotating by the said key to allow the material in the mass to be transposed to the extrusion feeding screw and prevent accumulated pressure and retain the natural voids as the result of grinding, an abutting member, a sliding plate in the abutting member having a transverse movement in either direction, a hole in the sliding plate serving as cutting edges through which the vertically reciprocating feeding tube extends and allows the material between the carton and supply to be cut off after the tube is removed, a foot lever, a bell crank automatically operated by the foot lever for operating the slide.

5. In an apparatus for filling unit or divisional cartons with minced material from a suitable supply having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, threads on the shaft co-operating with the threads cut in the encompassing piston which is free to move axially and restrained from rotating by said key to allow the material in the mass to be transposed to the extrusion feeding screw and prevent accumulated pressure and retain the natural voids as the result of grinding, a foot lever for placing the carton in position, a rheostat for starting the motor, a connecting rod between the foot lever and the rheostat having lost motion while the carton is being placed in position, further movement of the rod operating the rheostat lever to the position to where further pull is taken up by the tension of a spring for operating the rheostat lever and starting the motor, a lever, a reverse movement of the rod operating the lever pivoted on the frame for returning the rheostat lever by the balanced center and the spring returning the lever to the starting position when the carton table is lowered.

6. In an apparatus for filling unit or divisional cartons with minced material from a suitable supply having a hopper with a feed nozzle supported on a frame, a motor on the frame, a shaft rotated by the motor, a threaded piston in the hopper co-operating with the shaft, a key secured to the hopper, a feeding extrusion screw on the lower end of the shaft, threads on the shaft co-operating with threads cut in the encompassing piston which is free to move axially and restrained from rotation by said key to allow the material in the mass to be transposed to the extrusion feeding screw and prevent accumulated pressure and retain the natural voids as the result of grinding, an electrical circuit connecting the rheostat and the motor, a reversible switch in the electrical circuit for reversing the motor and piston screw to return the said piston in the hopper to the starting position.

GEORGE J. CADDY.